United States Patent [19]

Roman

[11] 4,412,785
[45] Nov. 1, 1983

[54] PUMPING APPARATUS

[75] Inventor: Walter G. Roman, Belleair Bluffs, Fla.

[73] Assignee: Westinghouse Electric Corp., Pittsburgh, Pa.

[21] Appl. No.: 245,490

[22] Filed: Mar. 19, 1981

[51] Int. Cl.³ .......................................... F04B 19/00
[52] U.S. Cl. ..................................................... 417/50
[58] Field of Search ........................................ 417/50

[56] References Cited

U.S. PATENT DOCUMENTS

| 2,715,190 | 8/1955 | Brill . | |
|---|---|---|---|
| 2,748,710 | 6/1956 | Vandenberg . | |
| 2,770,590 | 11/1956 | Serduke . | |
| 2,978,985 | 4/1961 | Lindenblad . | |
| 3,257,949 | 6/1966 | Mead . | |
| 3,567,339 | 3/1971 | Paine | 417/50 |
| 3,708,246 | 1/1973 | Radchenko . | |
| 3,885,890 | 5/1975 | Davidson . | |

FOREIGN PATENT DOCUMENTS 745460 2/1956 United Kingdom .
2033644 5/1980 United Kingdom .

OTHER PUBLICATIONS

*Nuclear Energy*, vol. 20, No. 1, Feb. 1981; D. F. Davidson; "Sodium Electrotechnology of the Risley Nuclear Power Development Laboratories"; pp. 79-90.

*Primary Examiner*—Alan Cohan
*Attorney, Agent, or Firm*—L. A. DePaul

[57] ABSTRACT

A pump and heat exchanger for pumping a conductive fluid through interaction with a magnetic field and a flowing second conductive fluid. A plurality of tube sets are arranged along radii of a circular annulus formed between two shells. One of the fluids is pumped by conventional means through the radial spaces between the tubes, generating currents and voltages which cause the other fluid to flow within the tubes and in the opposite direction. In magnetic air gap regions of the pump, the tubes are rectangular in shape. As a result of the circular geometry, currents flow circumferentially within the annulus, and voltages are maintained at a low value.

5 Claims, 6 Drawing Figures

PUMPING APPARATUS

BACKGROUND OF THE INVENTION

1. Field of the Invention

This invention relates to apparatus for pumping electrically conductive fluids, and more particularly to apparatus for pumping, and placing in thermal interexchange, plural conductive fluids in separate flow systems through utilization of magnetic field effects.

2. Description of the Prior Art

Electromagnetic systems for pumping conductive fluids, for example the liquid metals sodium and potassium, are well known. Also known is a dynamoelectric machine which utilizes flow of one conductive fluid, coupled with electromagnetic effects, to drive another conductive fluid in a separate flow system, as exemplified by the dual flow direct current linear electromagnetic pump disclosed in U.S. Pat. No. 2,715,190. Such pump includes plural spaced conduits, separated by electrodes and surrounded with numerous additional electrodes and conductors. The fluids flow counterdirectional in consecutive conduits. The multiple electrodes and conductors are required in order to create appropriate current flow paths. Such pump can also include elimination of the electrode between the conduits, but with retention of numerous conductors, to provide unidirectional fluid flow in consecutive conduits. The system should also require substantial amounts of electrical insulation.

Certain nuclear reactors have been proposed wherein a liquid metal such as sodium is circulated through a primary system, including the nuclear reactor core, which is placed in a heat transfer relationship with liquid metal in an intermediate, separate fluid circuit. The intermediate circuit is in a heat transfer relationship with a third circuit, which typically generates steam to drive a prime mover. Both the primary and intermediate liquid metal fluid circuits are complicated by the need for stop valves, check valves, pumps, heat exchangers and emergency cooling equipment.

It is desirable to simplify, and improve upon, proposed electromagnetic pumping systems as well as proposed nuclear systems.

SUMMARY OF THE INVENTION

This invention provides improved apparatus for pumping and providing heat exchange among conductive fluids in plural fluid systems, which is advantageously useful in nuclear reactor systems. Through utilization of a radial and annular orientation, a magnetically coupled pump alleviates the need for excessive conductors, electrodes and electrical insulation.

In preferred form, a circular annular region is formed between an inner shell and an outer shell. Disposed within the annular region are a plurality of tube sets. Each set includes a plurality of tubes extending radially across the annular region. The tubes of each tube set are closely positioned among one another in two air gap or magnetic driving regions of the pump, with relatively large radial spaces between consecutive tube sets.

The driving regions are those two areas where a generally circular magnetic flux path crosses the tubes in a radial direction. The flux path is formed by a pole piece positioned circumferentially about a portion of the external periphery of the tube sets and corresponding annular shaped pole pieces positioned within the internal periphery of the tube sets. The interior pole pieces are mounted about a cylindrically magnet, preferably including excitation windings and a permanent magnetic material.

A first conductive fluid is pumped through either the tubes or the spaces between the tube sets by conventional pumping apparatus, and a second conductive fluid flows through the other of the tubes or spaces. In an exemplary nuclear system, intermediate system liquid sodium is pumped through the spaces between the tube sets by an enlarged intermediate system pump. Primary system liquid sodium is conducted from the reactor core, to and through the tubes. In the air gap regions, the sodium flows are electromagnetically coupled such that the primary system sodium is driven through the tubes, by interaction with the radial magnetic flux and the circumferential currents generated by and the conventionally pumped intermediate sodium, counterdirectional to the intermediate sodium. Thus, the intermediate sodium not only drives the primary sodium, but also, because of tube side-shell side interaction, is in counterflow thermal interexchange with the hot primary sodium.

Additionally, the annular relationship substantially simplifies the components required, since, in an annular array, the tubes and current flow paths close on one another. Circumferential currents are generated within the annular region, and only minimal local currents occur at the shells or other components bounding the tube sets. The need for auxiliary high current conductors is eliminated, as is the need for excessive electrical insulation.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
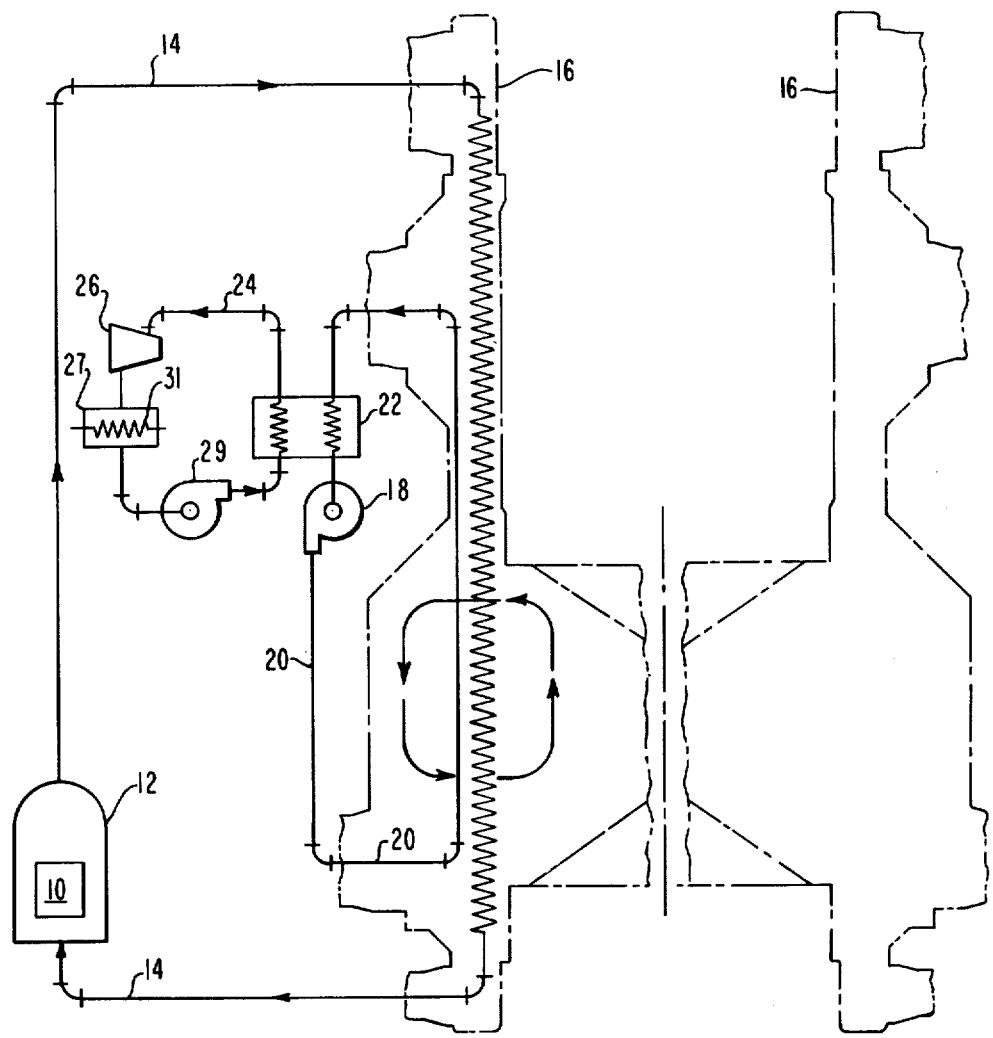
FIG. 1 is a simplified shematic of nuclear reactor plant systems in conjunction with the disclosed pumping and heat exchange apparatus.

Referring now to FIG. 1, there is schematically shown an exemplary nuclear reactor system including a nuclear core 10 disposed within a vessel 12. An electrically conductive primary reactor coolant fluid, such as sodium, enters the vessel 12, passes through the core 10 where energy is absorbed, flows through conduits 14 to a pump and heat exchanger 16, and is returned to the vessel 12, completing the primary circuit. An intermediate electrically conductive fluid, also a liquid metal such as sodium, flows through an intermediate system from a conventional pump 18; such as a centrifugal or electromagnetic unit, through conduits 20 to the pump and heat exchanger 16, through a steam generator 22 and back to the intermediate pump 18, completing the intermediate circuit. A vaporizable fluid, such as water, is circulated through a utilization system between the steam generator 22, conduits 24, a prime mover such as a turbine 26, a condenser 27, and a condensate pump 29. A cooling fluid, such as water, flows through tubes 31 within the condenser 27.

Energy from the nuclear reaction is transferred, in the pump and heat exchanger 16, to the intermediate system, and further transferred from the intermediate system to the utilization circuit in the steam generator 22. Although one circuit is shown for each of the three systems, multiple loops can be utilized, for example, three intermediate circuits, each having a pump 16, communicating with a single core and a single prime mover.

Figure 2A:
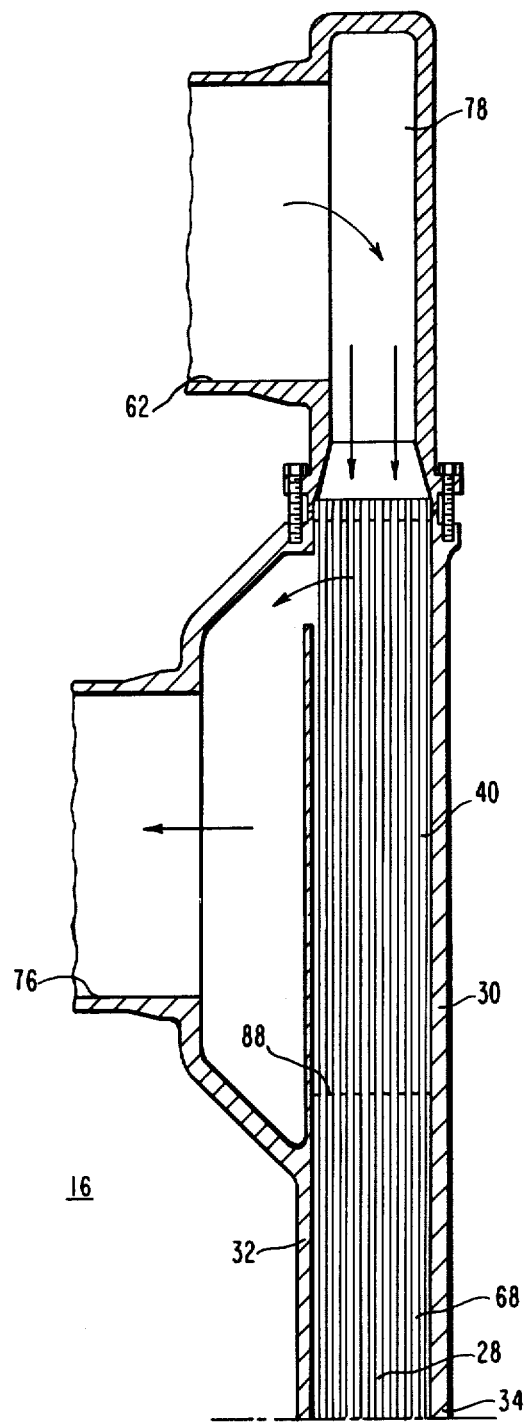
FIG. 2 (2A and 2B) is a cross sectional view, in elevation, of pumping apparatus in accordance with the invention.
Figure 2B:
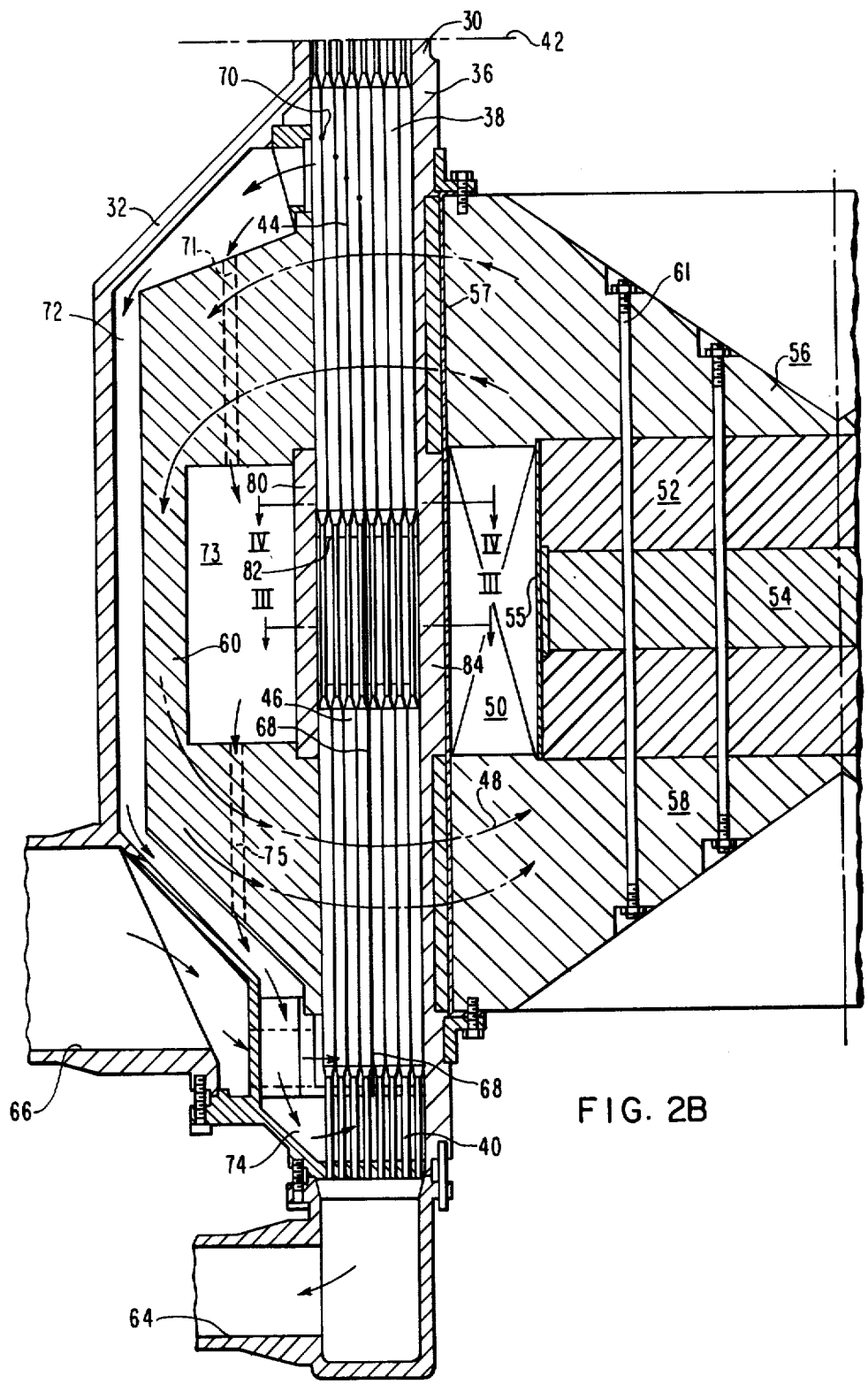
Figure 3:
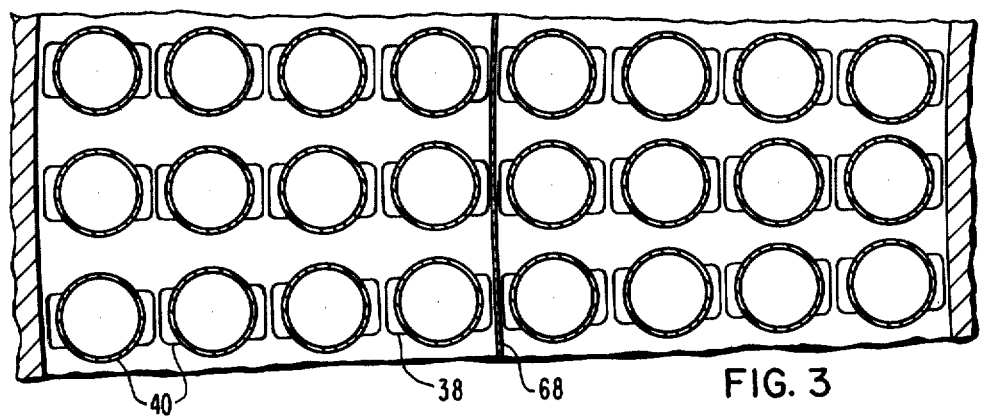
FIG. 3 is a cross sectional view taken at III—III of FIG. 2.
Figure 4A:
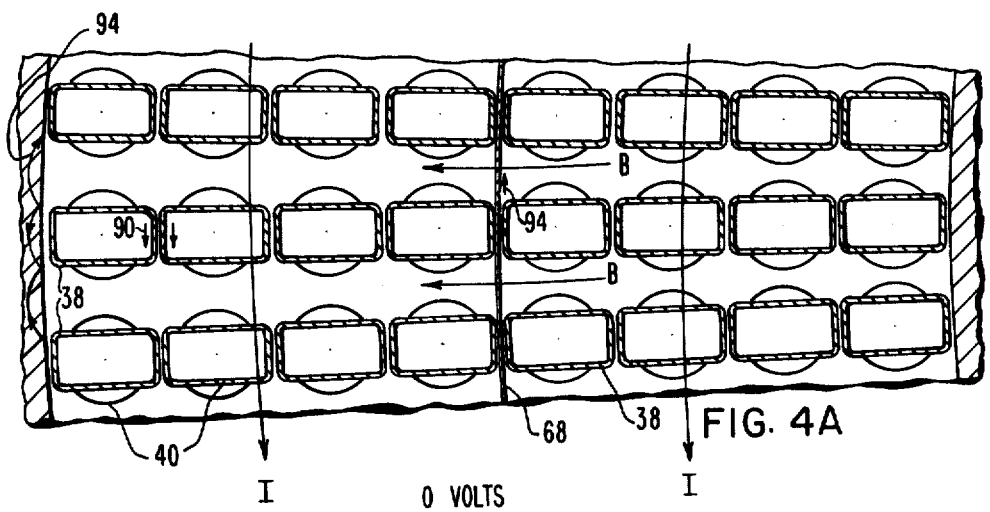
FIG. 4 (4A and 4B) is a cross sectional view taken at IV—IV of FIG. 2, also showing voltage across the components.
Figure 4B:
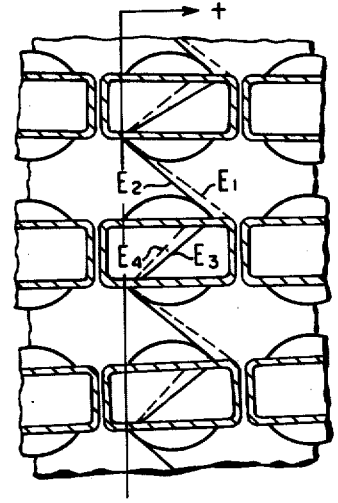

Additional detail of the pump and heat exchanger 16 is shown in FIGS. 2 through 4. The pump and heat exchanger 16 includes an annular region 28 defined between an inner shell 30 and an outer shell 32, which are generally cylindrical. For purposes of description, the pump 16 is divided into an upper section 34 and a lower section 36, separated at the line identified by reference numeral 42. Positioned within the annular region 28 are a plurality of tube sets 38, shown best in FIGS. 3 and 4. The tube sets are preferably arranged radially within the annular region 28. Each tube set includes a plurality of tubes 40. In the upper section 34 of the pump 16, above the line 42, the tubes are preferably circular in cross-section. In the lower section 36, however, the tubes preferably vary between a rectangular and a circular cross-section, being rectangular in regions 44 and 46 and circular above, below and between these regions. Configurations other than rectangular are also possible. However, in the regions 44 and 46 the tubes are elongated in the radial direction as compared to the circumferential direction. The regions 44 and 46, herein also referred to as air gap regions, are those areas through which magnetic flux fields, represented by the lines identified by reference numeral 48, cross the annular region 28 and tubes 40. The tubes 40 are preferably rectangular and are closely positioned in the air gap regions. The tubes can be formed from circular cross section structures which are flattened in the appropriate regions to form a rectangular shape. Alternatively, the tubes can be formed in appropriate sections which are joined together by means such as welding.

The magnetic flux is created by excitation coils 50 arranged on a spool 52. The spool 52 includes pole pieces 56, 58 comprised of a mild steel, and slabs 54 of a permanent magnet material such as Alnico V. The slabs 54 are cast and ground to a close fit in the region bounded by the pole pieces 56, 58 and a stainless steel cylinder 55 positioned between the slabs 54 and the excitation windings 50. A thermal insulation 57 is preferably positioned between the spool and the inner shell 30. The magnetic circuit further includes a pole piece, mild steel yolk 60, which is preferably magnetic and positioned between the outer shell 32 and the external periphery of the tube sets 38. In this manner the magnetic flux from the central excitation windings and pole pieces crosses the air gaps 44, 46 in a radial direction. The spool structures can be joined by through-bolts 61, which are preferably non-magnetic and comprised of Type 304 stainless steel.

A first electrically conductive fluid, such as hot liquid sodium discharged from the reactor vessel 12 of the exemplary nuclear reactor plant, enters the pump and heat exchanger 16 through an inlet nozzle 62. The fluid flows downwardly, through the tubes 40, and is discharged from the pump and heat exchanger 16 through an outlet nozzle 64. A second electrically conductive fluid, such as cooler liquid sodium from the steam generators 22 in the intermediate system, enters the pump and heat exchanger 16 through an inlet nozzle 66, and flows upwardly about the exterior of the tubes 40. While a single pass flow path is appropriate, a dual pass flow path is shown, since it is desirable in the exemplary nuclear application to have a greater flow rate in the primary system than in the intermediate system. Accordingly, sodium entering the pump and heat exchanger 16 through inlet nozzle 66 flows upwardly in a first pass about the outer four of the shown eight tubes 40 in each tube set 38. The tubes 40, in the lower part of the pump and heat exchanger 16, are separated by a vertical baffle 68. The sodium flows upwardly toward a sloped baffle 70, is turned 180° in a flow annulus 72, passes to a manifold 74, and upwardly, in a second pass, about the inner four tubes in each tube set 38. Above the sloped baffle 70, the sodium flows about all of tubes in each tube set 38. The intermediate system sodium is then discharged through outlet nozzle 76. As shown, a portion of the fluid in flow annulus 72 can be diverted through fill lines 71 into an annular cavity 73, provided with a drain line 75 back into the annulus 72. It is to be understood that, because of the radial geometry, the pump and heat exchanger 16 includes appropriately sized manifolds and nozzles to distribute the fluids within the unit.

While the particular shape, size and material composition of the components of the pump and heat exchanger 16 will vary dependent upon such factors as the pumping capacity required, the structure should provide that the magnetic flux crosses the air gap regions in a generally radial direction. In the exemplary unit shown, the central area within the flux lines 48 includes a non-magnetic insert 80 of Type 304 stainless steel, a spacer and support grid 82 among the cylindrical portion of the tubes 40 of each tube set 38, section 84 of the inner shell 30, also of non-magnetic Type 304 stainless steel, and the excitation coils 50. The flux path is formed through the yolk 60 of mild steel or magnetic Type 416 stainless steel, the air gap regions of the tubes 40, containing conductive fluids within and about the tubes, the pole pieces 56, 58 preferably comprised of a magnetic iron or mild steel, and the slabs 54 of spool 52.

The exemplary pump and heat exchanger 16, for nuclear application, for example, a primary system flow rate of 41 million pounds per hour distributed among three pump and heat exchanger units 16 would be large, approximately 49 feet high and 13 feet in outside diameter. The magnetic driving region, from the top of pole piece 56 to the bottom of pole piece 58, is approximately 76 inches in height. The air gap regions 44, 46 are approximately 12 inches wide in a radial direction and 30 inches high. In the rectangular orientation, each of the eight tubes in a tube set is 1½ inches wide in a radial direction and 0.7 inches across in the circumferential direction. The tubes have an 0.046 inch wall thickness, and can be spaced from one another approximately 0.025 inches. In the circular configuration, the tubes would have a 1.25 inch outside diameter. There are 240 tube sets 38 equally spaced at 1.5° intervals about the unit, each tube being 41 feet in overall length. The space between tube sets, at the inner periphery, is approximately 0.7 inch in the circumferential direction. The tubes 40 are preferably comprised of an Inconel alloy or a stainless steel, which is relatively high in electrical resistance so as to avoid current leakage losses. Although shown as straight, the tubes can be of other shapes common to conventional heat exchangers such as a partial helical orientation to accommodate thermal expansion.

It will now be apparent that with the disclosed radial and annular orientation, electrically conductive primary system sodium is on one side of each tube wall and intermediate system sodium is on the other side, thereby eliminating the need for additional current conductors. The forced axial flow of sodium in the intermediate system, between the tube sets, through the radial magnetic fields in the air gaps 44, 46, will produce a voltage (V) and current (I) in the circumferential direction, as shown in FIG. 4. The radial magnetic flux is represented by the arrows B. The current passes through the adjacent tubes and contained primary system sodium, producing a driving force in the opposite direction. In the preferred arrangement shown, a true counterflow results, intermediate system sodium flow being upwardly about the tubes and primary system sodium flow being downwardly within the tubes 40. Since the tube size and spacing can be relatively small, heat transfer characteristics are very good. The voltage as shown in FIG. 4 includes several components. $E_1$ is the voltage generated by the intermediate system, upwardly flowing sodium. $E_2$ is the effective voltage, $E_1-IR$. $E_3$ is the voltage applied to the downwardly flowing primary system sodium. And, $E_4$ is the back voltage generated by the downwardly flowing primary sodium, $E_3-IR$. Above the pumping section, where the tubes are circular, perforated baffles 88 (FIG. 2) can be utilized to promote cross flow and increased heat transfer capabilities.

As a result of the radial arrangement of magnetic fields and fluid systems, there are no excessively high voltages within the pump and heat exchanger 16. For example, the circumferential voltage generated in the flowing intermediate system sodium between tube sets 38 is immediately consumed to drive the primary sodium within the tubes 40. There is a slight rise in voltage across the intermediate system sodium, and an equivalent drop in voltage in the primary system sodium. Except for slight anomalies and maldistributions, these voltages will exactly match each other completely around the annular region 28. There will be some circulating current, as represented by lines 90, in each radial tube wall, but such will be relatively small so as not to substantially detract from pumping efficiency. Such losses can be reduced by increasing the length of the tubes in the radial direction. The desirability of increased length must, however, be balanced with the increased bending stresses imposed upon the elongated tube edges as a result of pressure differentials between the fluid systems.

It will also be recognized that is desired for specific applications, variation of the circumferential spacing among tube sets 38, or in the localized strength of the magnetic fields, can produce different pumping characteristics. Additionally, radial segmenting of the components of the pump and heat exchanger 16 can provide redundancy in the unlikely event of failure of one of the plural segments.

At the inner and outer radii, where the tube sets 38 contact the outer yolk 60 or inner shell 30 wall, the tube sets 38 will be at the same electrical potential, and no substantial circulating currents into these adjacent components should result. Along the walls of the adjacent components, between the tube sets 38 such as indicated at numeral 94 (FIG. 4), there will be some generation of current and small local circulating currents will exist. These local currents at the inner surface of the outer shell 32, the outer surface of the inner shell 30 and, for example, both faces of the baffle 68 can be alleviated by an insulating layer on the surfaces. For example, a layer of aluminum oxide can be plasma or flamed sprayed onto the components.

The disclosed system, through elimination of excessively high voltages, alleviates the need for large quantities of electrical insulation, typically required in electromagnetic liquid metal systems.

Additionally, coupling of the primary and intermediate systems eliminates the primary system pumps and check valves which have typically been proposed. Safety devices typically required in nuclear reactor primary systems, such as a pump pony motor and associated pump auxiliary equipment to provide emergency core cooling can now be provided in the intermediate, as opposed to the primary, sodium system.

System redundancy and reliability can be enhanced in addition to sectionalizing the pump and heat exchanger 16, by providing different power sources to the various electrically and mechanically segregated sections. The magnetic driving force circuit can be provided solely through electromagnetic structures, or, as discussed, include permanent magnetic material such as the Alinco V. With the disclosed arrangement, on startup of the reactor plant, the excitation coils 50 can be pulsed with a high current to saturate the Alinco V at, for example, about 16 kilogauss. The current would then be reduced to produce a flux of about 12 kilogauss in the core region, corresponding to about 5 kilogauss in the air gaps. At this flux, the Alinco V requires no magnetizing force. Thus, in the event of loss of electrical power to the coils, the Alinco V alone will maintain an emergency flux at about ten to twenty percent of full power levels, which would be sufficient for inherently handling the early stages of emergency cooling primary pumping requirements after reactor shutdown.

Since numerous modifications may be made in the above-described apparatus without departing from the spirit and scope of the invention, it is intended that the foregoing description be interpreted as illustrative, and not in a limiting sense.

I claim:
1. Apparatus for pumping plural conductive fluids, comprising:
   a generally cylindrical inner shell;
   a generally cylindrical outer shell concentrically spaced about said inner shell so as to form an annular region therebetween;
   a plurality of tube sets, each said tube set including a plurality of tubes positioned radially between said inner shell and said outer shell, with a flow space between each said tube set and its adjacent tube set, each said tube having an inlet and an outlet;
   a pole positioned inside of said inner shell;
   a pole piece positioned outside of said inner shell;
   excitation windings positioned inside of said inner shell;
   a permanent magnetic material positioned inside of said inner shell for creating a magnetic flux path radially across a portion of said annular region;
   means for pumping a first conductive fluid through said flow spaces between said tube sets; and means for flowing a second conductive fluid to said tube inlets;

whereby as a result of the interaction among said first pumped conductive fluid, said flux path, and said second conductive fluid, said second fluid is pumped through said tubes and said conducting means.

2. The apparatus of claim 1 wherein said tubes include a segment circular in cross section and a segment rectangular in cross section.

3. The apparatus of claim 1 wherein said pole piece positioned outside of said inner shell includes an annular cavity, and further comprising means for flowing a portion of said first conductive fluid through said cavity.

4. The apparatus of claim 2 wherein said rectangular segment is positioned within said annular region at a location where said magnetic flux path crosses said annular region.

5. The apparatus of claim 1 wherein said second conductive fluid has a temperature different from the temperature of said first conductive fluid whereby the flow of said first conductive fluid through said flow spaces between said tube sets and the flow of said second conductive fluid between said outlets and inlets establishes heat transfer between said fluids.

* * * * *